US00RE45350E

(19) United States
(12) Reissued Patent
Margolus et al.

(10) Patent Number: US RE45,350 E
(45) **Date of Reissued Patent: *Jan. 20, 2015**

(54) STORAGE SYSTEM FOR RANDOMLY NAMED BLOCKS OF DATA

(75) Inventors: Norman H. Margolus, Cambridge, MA (US); Edwin Olson, Cambridge, MA (US); Michael Sclafani, Somerville, MA (US); J. Corwin Coburn, Cambridge, MA (US); Michael Fortson, Cambridge, MA (US)

(73) Assignee: Permabit Technology Corporation, Cambridge, MA (US)

( * ) Notice: This patent is subject to a terminal disclaimer.

(21) Appl. No.: 12/953,901

(22) Filed: Nov. 24, 2010

Related U.S. Patent Documents

Reissue of:
(64) Patent No.: 7,457,800
Issued: Nov. 25, 2008
Appl. No.: 11/246,004
Filed: Oct. 6, 2005

U.S. Applications:
(60) Provisional application No. 60/616,653, filed on Oct. 6, 2004.

(51) Int. Cl.
*G06F 17/30* (2006.01)

(52) U.S. Cl.
USPC ..... 707/741

(58) Field of Classification Search
USPC ..... 707/741
See application file for complete search history.

(56) References Cited

U.S. PATENT DOCUMENTS

| | | | | |
|---|---|---|---|---|
| 3,668,647 | A | 6/1972 | Evangelisti et al. | |
| 4,438,522 | A * | 3/1984 | Bluethgen | 375/246 |
| 5,450,553 | A * | 9/1995 | Kitagaki et al. | 711/214 |
| 5,717,908 | A * | 2/1998 | Dulong | 712/221 |
| 5,813,008 | A | 9/1998 | Benson et al. | |
| 5,870,747 | A * | 2/1999 | Sundaresan | 707/101 |
| 5,990,810 | A | 11/1999 | Williams | |
| 6,119,133 | A * | 9/2000 | Nusbickel et al. | 707/205 |
| 6,366,900 | B1 * | 4/2002 | Hu | 707/1 |

(Continued)

FOREIGN PATENT DOCUMENTS

| | | |
|---|---|---|
| WO | 01/61438 | 8/2001 |
| WO | 2004/074968 | 9/2004 |

OTHER PUBLICATIONS

Quinlan et al., Venti: a new approach to archival storage., Jan. 28-30, 2002, Proceedings of the FAST '02 Conference on File and Storage, p. 89-102 of the Proceedings.*

(Continued)

*Primary Examiner* — Jorge A Casanova
(74) *Attorney, Agent, or Firm* — Fish & Richardson P.C.

(57) ABSTRACT

A method for constructing an index suitable for indexing a large set of records identified by long generally randomly distributed record names and for answering membership queries about the set, the method comprising assigning each different record a different record name, determining that a new record name is not already represented in the index by checking an entry in a first level index that is shorter than the complete new record name, and determining that a queried record name is already represented in the index by determining that the queried record name is represented in a second level index that contains enough information to reconstruct the complete queried record name.

19 Claims, 11 Drawing Sheets

EXAMPLE OF ENCODING A SPARSE SET OF RANDOMLY DISTRIBUTED RECORD NUMBERS INTO AN INDEX LIST

(56) References Cited

U.S. PATENT DOCUMENTS

| | | | | |
|---|---|---|---|---|
| 6,374,266 | B1 * | 4/2002 | Shnelvar | 707/204 |
| 6,470,287 | B1 * | 10/2002 | Smartt | 702/102 |
| 6,496,830 | B1 * | 12/2002 | Jenkins, Jr. | 707/100 |
| 6,499,033 | B1 * | 12/2002 | Vagnozzi | 707/101 |
| 6,625,591 | B1 | 9/2003 | Vahalia et al. | |
| 6,912,645 | B2 | 6/2005 | Dorward et al. | |
| 6,928,526 | B1 | 8/2005 | Zhu et al. | |
| 7,107,416 | B2 | 9/2006 | Stuart et al. | |
| 2002/0038296 | A1 | 3/2002 | Margolus et al. | |
| 2002/0144057 | A1 | 10/2002 | Li et al. | |
| 2003/0046497 | A1 * | 3/2003 | Dandrea | 711/154 |
| 2003/0065652 | A1 | 4/2003 | Spacey | |
| 2003/0110356 | A1 * | 6/2003 | Williams, III | 711/133 |
| 2003/0135495 | A1 * | 7/2003 | Vagnozzi | 707/3 |
| 2003/0225974 | A1 * | 12/2003 | Bopardikar et al. | 711/133 |
| 2004/0024778 | A1 * | 2/2004 | Cheo | 707/104.1 |
| 2005/0055257 | A1 * | 3/2005 | Senturk et al. | 705/8 |
| 2005/0138031 | A1 * | 6/2005 | Wefers | 707/9 |
| 2005/0210028 | A1 | 9/2005 | Kodama | |
| 2005/0216669 | A1 | 9/2005 | Zhu et al. | |

OTHER PUBLICATIONS

Burton H. Bloom in "Space/Time Tradeoffs in Hash Coding with Allowable Errors," Communications of the ACM, Jul. 1970.

National Institute of Standards and Technology, NIST FIPS PUB 180-2, "Secure Hash Standard," U.S. Department of Commerce, Aug. 2002.

Witten et al., "Managing Gigabytes," Morgan Kaufmann (1999).

Little et al., "Using Bloom Filters to Speed-Up Name Lookup in Distributed Systems," Computer Journal Oxford University Press for British Comput. Soc UK, vol. 45, No. 6, pp. 645-652 (2002).

* cited by examiner

EXAMPLE OF ENCODING A SPARSE SET OF RANDOMLY DISTRIBUTED RECORD NUMBERS INTO AN INDEX LIST

EXAMPLE OF TRUNCATING A BLOCK NAME delta (8) + era_number (13) + ref/lease (3)
+ (extra info) (8n)

A byte-oriented entry format for the first level index

FIG. 4 zero (8) + delta (8)

+ next-bits$_1$ (7) + last-flag (1) + annotation (16)
+ next-bits$_2$ (7) + last-flag (1) + annotation (16)
+ . . .
+ next-bits$_n$ (7) + last-flag (1) + annotation (16)

A format for collision entries

FIG. 5

| |
|---|
| Block name (32 bytes) |
| Type (content-named, other-named) |
| Offset to location (2 bytes) |

Era Index Entry Format Example

FIG. 6

| ref / lease bits | meaning |
|---|---|
| 000 | old lease, ref count = 0 |
| 001 | old lease, ref count = 1 |
| 010 | old lease, ref count uses extra bits |
| 011 | new lease, ref count = 0 |
| 100 | new lease, ref count = 1 |
| 101 | new lease, ref count uses extra bits |
| 110 | no lease, ref count = 0 |
| 111 | no lease, ref count = 1 |

Example of encoding lease and reference count information in an annotation

FIG. 7

Example of disk append-log journal structure

Example of disk journal frame structure

Reaping a shared block

Address Range

| | 000... | 001... | 010... | 011... | 100... | 101... | 110... | 111... |
|---|---|---|---|---|---|---|---|---|
| Data Store | A,B | B,C | C,D | D,A | A,C | B,D | C,A | D,B |

Example of allocation of address ranges to four data stores

FIG. 11

Address Range

| | 00... | 01... | 10... | 11... |
|---|---|---|---|---|
| Data Store | A | E | A | B |
| | B | F | E | F |
| | C | G | C | D |
| | D | H | G | H |

Example of allocation of address ranges to eight data stores

FIG. 12

| 00... |
|---|
| A |
| B |
| C |
| D |

00<u>00</u>... → (A,B,C,D)
00<u>01</u>... → (B,C,D,A)
00<u>10</u>... → (C,D,A,B)
00<u>11</u>... → (D,A,B,C)

Example of ordering data stores within an address range

FIG. 13

The addition of parity information to eras to allow recovery from disk read errors Read-error recovery when an error encompasses a region overlapping two adjacent chunks of an era Two sectors that are radially adjacent on a disk Two alternatives for organizing parity information for read-error recovery when errors on radially adjacent sectors are correlated A: delta (8) + era number (15) + extra-info-flag (1) + (extra info) (8n)

B: delta (7) + extra-info-flag (1) + (extra info) (8n)

C: delta (15) + disk location (32) + extra-info-flag (1) + (extra info) (8n)

Three alternative byte-oriented formats for entries in the first level index

An example of the use of byte-range retention leases to protect a data store journal from modification

STORAGE SYSTEM FOR RANDOMLY NAMED BLOCKS OF DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority to U.S. Provisional Application Ser. No. 60/616,653, filed on Oct. 6, 2004.

TECHNICAL FIELD

The invention relates to storage systems for computers, and particularly to systems designed for storage of large unstructured collections of data objects.

BACKGROUND

The performance of a modem file system depends upon assumptions about the structure of the file sets that it will store. File systems are not well suited to storing large sets of files with randomly chosen names or randomly chosen pathnames. An object storage system is similar to a file system but without the hierarchical directory structure. Objects may be named in an essentially random manner. Using an ordinary file system as an object storage system, to store hundreds of millions or billions of randomly named objects, results in very poor performance.

If the set of object names is large and the names themselves are large, a complete list of names will not fit into random access memory. The straightforward alternative is to implement a hash table on disk, as is done for example in the Venti storage system described in Sean Quinlan and Sean Dorward, "Venti: a new approach to archival storage," in the Proceedings of the Conference on File and Storage Technologies (2002). This approach requires at least one access to an essentially randomly chosen disk location in order to get a pointer to the location of the object itself on disk.

Some object storage systems use a cryptographic hash of a block of data to name the block. A cryptographic hash is a function that deterministically computes a fixed width pseudo-random number (sometimes called a message digest or a fingerprint) from an input of any size. For example, the output of the SHA-256 cryptographic hashing algorithm is 256 bits wide (see National Institute of Standards and Technology, NIST FIPS PUB 180-2, "Secure Hash Standard," U.S. Department of Commerce, August 2002).

The Venti storage system is an example of an object storage system that uses a cryptographic hash of a block of data to name the block. In the Venti storage system storage space is conserved by avoiding storing duplicate copies of identical blocks, which have identical object names. Another example of a storage system that uses cryptographic hashes for block naming is described in Margolus et. al, "A Data Repository and Method for Promoting Network Storage of Data," US 2002/0038296 A1, Mar. 28, 2002. This second example supports a network protocol that allows bandwidth to be conserved in storing hash-named blocks of data by answering a query as to whether the name already exists in the storage system, and only sending the block if it does not. Supporting this kind of protocol well requires a storage system that can answer a query about the existence or non-existence of one object out of a very large set of objects efficiently and quickly.

This is the problem of detecting set membership. One of the earliest and most important contributions to this subject came from Burton H. Bloom in "Space/Time Tradeoffs in Hash Coding with Allowable Errors," Communications of the ACM, July 1970. He observed that the problem can be simplified by allowing a small rate of false positive answers, which then need to be resolved using some other mechanism. His hashing technique requires about $r(\log_2 e)$ bits of storage per element of the set represented, in order to have a false-positive rate of $2^{-r}$. Note that this storage requirement depends only on the number of elements in the set, and not on how big the elements are. Bloom's technique (now called a Bloom Filter) is widely used today. It does not, however, provide a mechanism for indexing the data and finding it, only for testing whether it exists.

In the domain of text indexing and searching, the problem of efficiently storing indexes for large collections of text records has been studied. One technique used there is Inverted File Indexing, which is described for example in the book by Witten, Moffat and Bell, "Managing Gigabytes," Morgan Kaufmann (1999). This technique involves sorting record numbers in the index and only representing differences in lists of record numbers. This technique wouldn't, however, save a significant fraction of the space in an index involving a sparse space of record numbers, as is the case with long hash-based names.

In addition to the problem of indexing randomly named objects, there is also the problem of organizing their storage on disk for efficient access and modification. The Venti storage system uses an append-log structure and makes no provision for ever changing, deleting or rearranging the stored items on disk. Although Venti was designed for archival storage, the lack of deletion capability is a significant drawback when archiving sensitive data that must, under law, be retained for some period of time but can then be deleted.

SUMMARY

In general, the invention features a method for constructing an index suitable for indexing a large set of records identified by long generally randomly distributed record names, and for answering membership queries about the set, the method comprising adding a new record to the set and assigning the new record a new record name using a process designed to produce names where at least a portion of each name is at least approximately random, determining that the new record name is not already represented in the index by checking a first level index that does not contain information sufficient to reconstruct the complete record names of records that have already been added to the index, abbreviating the new record name to form a new abbreviated name that is shorter than the new record name but that is sufficient to distinguish it from record names already represented in the index, combining the new abbreviated name with an abbreviated name of a record already represented in the first level index, to form a combined record name which is shorter than either of the abbreviated names that were combined, adding the combined record name to the first level index to form a new first level index entry that represents the new record, adding a new entry to a second level index that includes the complete new record name or enough information to reconstruct it, determining that a queried record name is already represented in the index by first determining that the queried record name is represented by the new first level index entry and then determining that the queried record name is represented by the new second level index entry, wherein each different record in the set is assigned a different record name, wherein each different record in the set has a different entry in the first level index, wherein at least a portion of the first level index is ordered based on abbreviated record names.

In preferred implementations, one or more of the following features may be incorporated. At least a portion of the index may be organized based on when records were added to the index. The first level index may be stored in RAM and the second level index may be stored on disk. The abbreviated record name may be obtained by omitting some subset of the bits of the binary value that represents the record name. The combining may involve computing an arithmetic difference of the two abbreviated names or computing some other arithmetic or finite-field arithmetic operations involving portions of the two abbreviated names. The process of assigning the new record name may involve generating a pseudo-random name, or computing a cryptographic hash of at least a portion of the record itself, or computing a cryptographic hash of some combination of record identifying information which is known to be unique. A portion of the index may represent a set of records for which record names were added to the index during a span of time that includes the time that the new record was added, and the portion may be retrieved as a unit in order to get additional information about the new record, and information about other records added during the span of time may be cached in RAM. Records or index information may be stored in a sequential log-structure on disk, and extra information recording the bitwise XOR of a set of blocks comprising a segment of the sequential log-structure may be written to disk to allow unreadable sectors on disk to be reconstructed. The space of possible record names may be divided up into a set of disjoint subspaces, each of which may be associated with one or more of a plurality of instances of the index. Different indexes associated with the same subspace may be assigned different roles based on a portion of the record name. The new record may be a block of content and the new record name may be a cryptographic hash of the block of content, and the index may be queried in order to avoid repeatedly transmitting or repeatedly storing the block of content. The record name may be added to the index a second time, and a reference count associated with the record name may indicate that the record has been added twice. An annotation may be attached to the new entry in the first level index which includes information related to the new record or an indication of where additional information can be found. The invention may further comprise adding a second new record to the set and assigning the second new record a second new record name which is different than the new record name, determining that the first level index does not contain sufficient information to decide whether or not the second new record name is different than the first new record name, and adding an entry to the first level index that represents the second new record name and that is shorter than the second new record name.

Other features and advantages of the invention will be apparent from the drawings, detailed description, and claims,

DESCRIPTION OF DRAWINGS

FIG. 4 shows a byte-oriented entry format for the first level index.

FIG. 5 shows a format for index entries used when different block names match (collide) when truncated.

FIG. 6 shows a format for index entries of a segment of a second level index (era index).

FIG. 7 shows an encoding of lease and reference count information into an annotation attached to a first level index entry.

FIG. 11 illustrates how multiple data stores (four in the example) can be assigned ranges of block names based on some name bits.

FIG. 12 again illustrates how multiple data stores (eight in the example) can be assigned ranges of block names.

FIG. 13 illustrates how data stores assigned to a given address range can be ordered based on another part of the block name.

DETAILED DESCRIPTION

There are a great many different implementations of the invention possible, too many to possibly describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Introduction

In this description we will use the term block name to refer indifferently either to a name for a block of content that may be arbitrarily assigned or to a name based on a cryptographic hash of the block content.

If all block names are based on a cryptographic hash of the block content (e.g, SHA-256), then block names are statistically guaranteed to be unique and randomly distributed. This same guarantee can also be made if all block names are based on a hash of some unique identifier associated with the block of content: for example, a file pathname along with a unique identifier for a file system. If both types of block names are used, then a block type can be prepended to the data to be hashed (content or identifier), to ensure that the data hashed is never the same in constructing the two kinds of names. As long as the block type for a content-based name is different from the block type for a unique-identifier-based name, the chances of an accidental agreement (collision) between a pair of names of the two types is no greater than for any pair of names of one type or the other. Block names, as defined here, are statistically guaranteed to be unique block identifiers.

The Data Repository envisioned in US 2002/0038296 A1 and related applications can be implemented as a distributed collection of storage servers, each of which is assigned responsibility for some portions of a block-name address space. Each storage server is assigned a set of ranges of block-name values. Within each storage server, one or more Data Stores, each associated with physical disk storage devices, is ultimately responsible for storing and indexing large numbers of pseudo-randomly named blocks of data.

Indexing the Data Store

The initial prototype of the Data Repository used a Data Store that embedded block names into an ordinary Linux ext2 filesystem. Even after tuning the mapping between block names and pathnames, as the number of named blocks in the store reached a few million, it took dozens of disk seeks, on average, to access each stored block. The problem of simply querying whether a given block name was already in use was similarly inefficient. Achieving bandwidth and storage savings for content-named blocks depends on this query.

Figure 1:
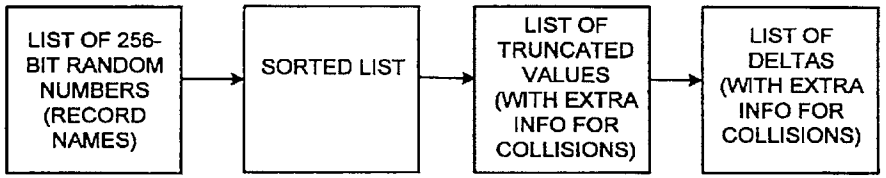
FIG. 1 shows the transformations involved in encoding a sparse set of randomly distributed record numbers into an index list.

An obvious alternative for implementing a simple and fast indexing scheme would be to keep all of the index information in RAM. Given 256-bit hash-based block names and an expectation of storing and indexing several hundred million named blocks per storage server, this at first seemed impractical. A mechanism that makes it practical is illustrated in FIG. 1. This mechanism exploits the predictable properties of a large set of high-quality pseudo-random numbers. To simplify the discussion here, it will be assumed that address ranges based on some number of the least significant bits of the block names are used to assign ranges of block names to Data Stores, so that the rest of the bits can be assumed to be random.

As is indicated in FIG. 1, the index is maintained in sorted order. Given a maximum of N numbers to index (e.g., a few hundred million) and a range of name values of size L (e.g., $2^{256}$), the average separation between adjacent values in the sorted list is L/N. The distribution of differences between adjacent values in this sorted list is exponential: the chance that the separation will be more than x times the average is exp(−x) in the limit of large N. This can be seen by regarding the values in the list as binary fractions with an average separation of 1/N, and observing that the probability of a difference greater than x/N is $(1-x/N)^N$.

Thus, for example, the chance that the separation between two adjacent values in the sorted list is four times the average is about 1.8%. This means that the chance that the first ($\log_2 N-2$) bits of the difference are all zero is over 98%. If differences between adjacent values (deltas) are stored in place of the original values in the sorted list, the same information is represented but in almost all cases, the first ($\log_2 N-2$) bits of the differences don't need to be represented. This, however, does not by itself provide a significant space savings, since N is so much smaller than L.

As is indicated in FIG. 1, in this implementation the block names in the sorted list are truncated before computing the deltas. A power of two value M (smaller than L) is chosen, and for each block name, all but the first $\log_2 M$ bits are omitted (i.e., the range of values is reduced to M rather than L). The probability that a given truncated block name collides with (i.e., matches) some other truncated block name is less than N/M (there are fewer than N choices out of M that result in a collision). This means that the fraction of the truncated block names that are not uniquely associated with a single full block name is less than N/2M (since both colliding names become one name).

Figure 2:
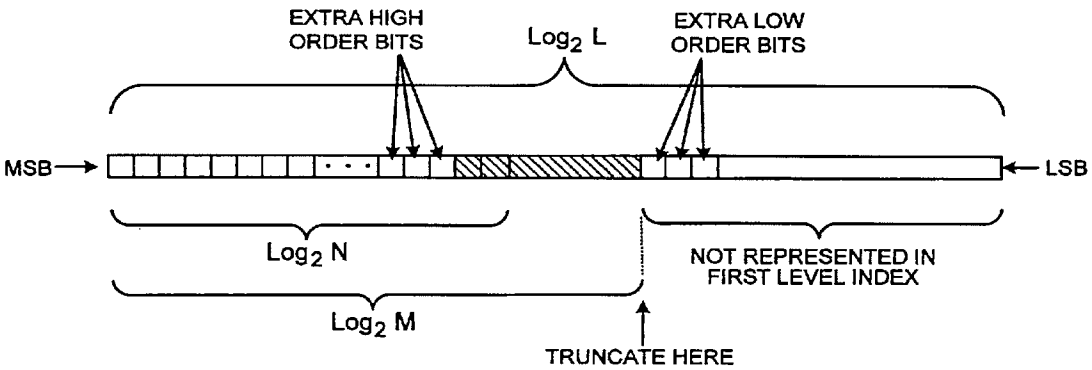
FIG. 2 shows an example of truncating a block name for use in an index list.

Thus, for example, if M=32N, the fraction of the truncated values that represent collisions is about 1.6%, and the truncated value is only 5 bits longer than $\log_2 N$. Putting these two observations about the improbability of big deltas and small deltas together (see FIG. 2), one finds that the probability that it is necessary to store more than a 7-bit difference in order to represent a unique initial segment of each block name is about 3.4%: a 1.8% chance that any of the first ($\log_2 N-2$) bits need to be represented, and a 1.6% chance that any of the bits past ($\log_2 N+5$) need to be represented. By including a small amount of extra information in these 3.4% of the cases, it is possible to represent a unique initial segment of each of the block names using an average of less than one byte per block name. This is a reduction in space of a factor of 32 for SHA-256 based block names.

The amount of space needed per block name is independent of both the size of the original block name and the number of names in the index. The position at which block names are truncated (i.e., the value of M) depends on the value of N, the maximum number of entries that the data store is designed to index. This number needs to be known in any case, however, since the maximum memory requirements for the index are proportional to the maximum number of blocks being indexed.

Querying the Index

Under the proposed scheme, for almost all block names only the first $\log_2 M$ bits of the name are represented in the index list. This means that, when the index is at its maximum size of N entries, the chance that a randomly chosen name collides with an existing entry in the index list is about N/M. This is the chance that a queried name that matches in the index list is not actually in the list of full block names. This is the false-positive rate of the index list as a membership tester. If M=32N, this is about 3%. If M=64N (one more bit) this is about 1.6%. There is no chance that the index list will incorrectly indicate that a queried item is not in the full list.

This compares favorably with the Bloom Filter technique mentioned in the Background section, which requires $r \log_2 e$ bits per indexed item to achieve a false positive rate of $2^{-r}$. The index list technique uses less than r+3 bits per item, and unlike the Bloom Filter provides a full index, with a distinct entry for each item indexed.

In the case where the queried name agrees to $\log_2 M$ bits with an entry in the list, more definitive information must be accessed in order to verify that the name agrees to all $\log_2 L$ bits. This more definitive information can be kept on disk, and constitutes a second level of indexing. The second level of index could, for example, simply be a complete hash table on disk. One access to the second level index on disk is sufficient resolve any ambiguity. The first level index, in RAM, is constructed so that there is a low probability of finding that a queried name matches a first level index entry but is not actually present in the index. To a good approximation, the first level (in RAM) index indicates which names do not exist with no access to disk. Queries concerning names that do exist require one access to disk. This approach makes it practical for a storage client to always query when depositing content-named blocks into the storage system, in order to save bandwidth by avoiding transmitting blocks that are already stored. It also makes it efficient to share storage space when a previously stored content-named block is deposited again.

Adding an Entry to the Index

When a new named block is written to the data store, the index is queried to find out if the name already exists in the data store. In the course of this query, the block name of any colliding entry is retrieved. In the case of a collision, additional bits of both the old entry and the new entry are added to the first level index, so that both entries will represent a unique initial segment of the full block name.

Retrieving a Named Block

Since each named block has a distinct entry in the first level index, one could simply annotate each entry with the location of the block on disk. This would add several bytes to each entry, but would always allow a named block to be retrieved with a single disk access. The disk access would retrieve both the block and the full block name (or enough information to reconstruct it), which would be tested to determine if it is the block being queried. Alternatively, the second level index used for disambiguating collision cases could be a simple hash table on disk, and all retrievals could involve accessing this table to find both the full block name and block location, and then retrieving the named block itself. This second approach adds no data to the first-level index entries, but always takes two disk accesses to retrieve a block. An intermediate scheme, which adds a small annotation to each first-level index entry, is currently preferred. This intermediate scheme performs about as well as the full annotation scheme (in which block location is put in the first-level index) when patterns in the write order of named blocks are reflected closely in the retrieval order. By storing segments of second level index information close to the data blocks that they index, and that are written at about the same time, both storage and retrieval of the data blocks can also be made more efficient.

The Data Store

The Data Store disclosed here is only one possible realization of the approach outlined in the Introduction. Some possible alternatives and enhancements will be discussed in the section on Other Implementations. The indexing technique used here is also widely applicable.

Figure 3:
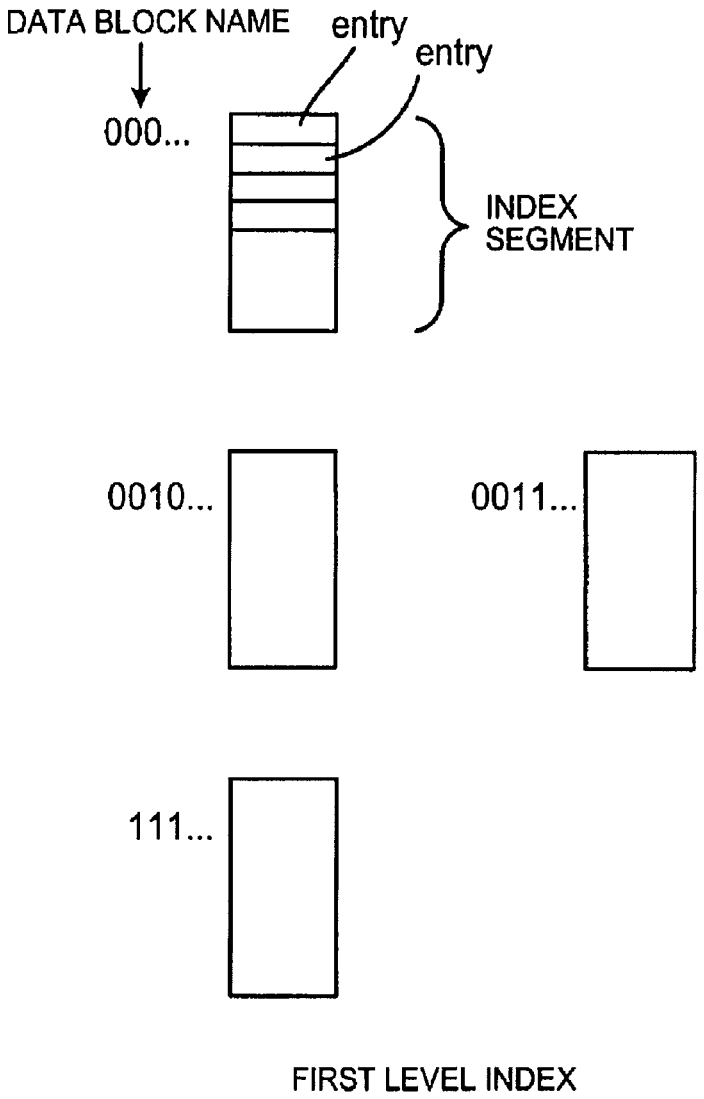
FIG. 3 shows a first level index divided up into index segments.

FIG. 3 illustrates the structure of the first level index, which would normally be kept in RAM. The first level index is split up into segments, with each segment corresponding to a portion of the block name address space. This is accomplished in the illustration using an initial portion of the block name as a segment number. In the preferred implementation a separate fixed size array structure is associated with each segment. Initially a small number of segments are allocated, and whenever a segment becomes full its address range is cut in half and part of its contents are moved to a newly allocated segment responsible for the other half of the range. The number of initial bits of a block name needed to identify the corresponding segment-array is variable.

Each segment of the first level index comprises a list of entries maintained in sorted order, with the order determined by the truncated block names that are represented. Entries have two parts: a delta value that records the difference between an entry and the previous entry, and an annotation that records information about the named block corresponding to the index entry. Every index entry corresponds to one block, and every block has a single index entry.

Encoding Deltas

FIG. 4 shows the byte-oriented index entry format used in so the preferred implementation. This format uses a one-byte delta value and two bytes of annotation. Two extra bytes of information are appended if there is delta overflow (difference too large, indicated by a delta of $2^8-1$). This allows a truncated value with 8 extra (higher order) bits to be represented. If this isn't enough (indicated by a delta of $2^{16}-1$), then more bytes are appended, etc. This encoding uses about 0.3 extra bits per entry, on average, when the index is at maximum size.

Collisions (delta of zero) are handled most simply by using an auxiliary table with a full representation of one of the pair of colliding block names. This approach requires about 1.9 extra bits per entry, on average, when the index is at maximum size. The auxiliary table is always checked first in any index lookup.

A more compact representation is used to handle collisions in the preferred implementation. A few extra bits are added to entries in the first level index to make colliding entries distinct. This approach is illustrated in FIG. 5. A delta of 0 is used to signal the beginning of a collision record. This is followed by a delta that encodes the $\log_2 M$ bit truncated value that collided. Individual entries for the colliding block names then follow, each containing the next few bits past the original point of truncation and a normal entry annotation. The last collision entry is flagged, and the entry following it is a normal entry, with a delta relative to the preceding delta. Additional levels of collision record are defined (but not illustrated) in case two or more of the next-bits values are the same: different continuations past a common stem are again encoded. The average number of extra bits used by this encoding is about 0.125 bits per entry when the index is at maximum size.

Encoding Annotations

FIG. 4 provides a byte oriented format for encoding index annotations: information about the named block that corresponds to the index entry. In the preferred implementation, first level index entries are always an integer number of bytes long. This constraint is of course only a convenience.

In the index format of FIG. 4, most index entries are three bytes long. This format comprises 13 bits of an Era Number that associates one of up to 8K segments of a second level index on disk with the indexed block. Each segment is referred to as an Era Index, and is stored at a location on disk near to the named blocks that it indexes. The Era Index consists of a list of entries with the format shown in FIG. 6 (full block name, block type, and relative location of the block on disk).

The annotation also contains 3 bits that are used for keeping track of "reference counts" and "leases" (encoded as in FIG. 7). Content named blocks may be shared as components of larger objects. The data store keeps track of a reference count, in order to know if all larger objects that reference a given block have been deleted, and so the shared block can itself be deleted. Clients of the data store explicitly tell the data store when to increment and decrement reference counts associated with content-named blocks. Most content-named blocks will have a reference count of either zero or one, since most blocks will not be shared. If the reference count is higher, extra bits are appended to the index entry annotation to allow this information to be represented.

Leases are useful for content-named blocks which have not yet been incorporated into any larger structure, and so have a reference count of zero. Leases are used to guarantee that a newly deposited block is retained for at least 24 hours before it becomes subject to deletion because it is not in use. When a content-named block is deposited, it is given a new lease. Every 24 hours, a background process turns all new leases into old leases and all old leases into no-lease. A content-named block with no lease and a reference count of zero may be deleted by the data store and its space reclaimed.

On-Disk Format

Figure 8:
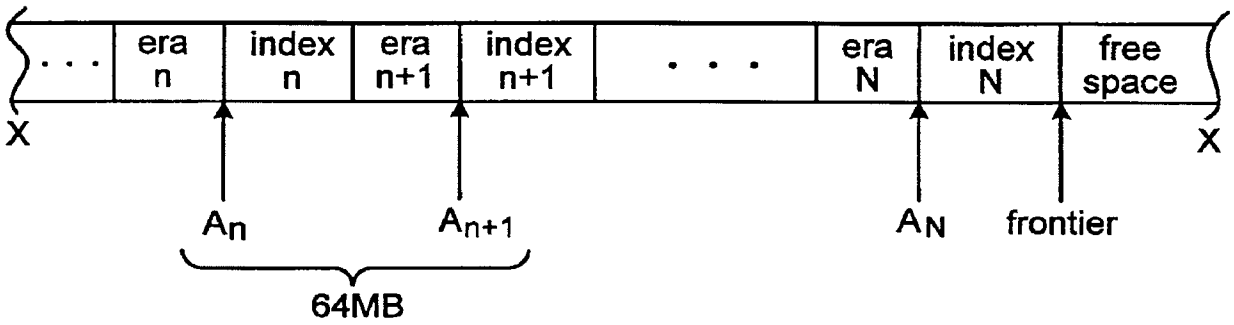
FIG. 8 shows a disk storage format organized as an append log of journal frames.

FIG. 8 shows the logical disk format used by the Data Store. This format is designed to aid in the storage, indexing and retrieval of randomly named blocks of data.

In a modern file system, advantage is taken of the fact that items that are stored in the same directory are more likely to be accessed together than files in different directories. This allows a file system to optimize access to disk by caching directory information for files that have recently been accessed, and thus reduce the amount of disk activity needed to find the location of stored data.

In a data store with randomly named blocks of data, there are no directory structures available to provide hints as to which blocks are likely to be accessed together. An alternative clue is available: temporal locality. Blocks of data that are written at about the same time are more likely to be read at about the same time.

This suggests that the on-disk format for the data store should have the structure of an append-log: new information is written immediately after the latest information previously written. Segments of indexing information are inserted at intervals into this log. This structure allows fast writing, since all data is written to the same place (thus avoiding disk seeks). This structure keeps data that was written at about the same time close together on disk. This structure also provides a natural way to index information that was written at about the same time. By writing all data as journal frames with extra information attached to aid recovery, and by making the structure of the on-disk log regular, recovery from system failure is made easier and more reliable.

FIG. 8 shows the disk structure used by the preferred implementation of the data store. The segments of indexing information start at predictable regularly-spaced positions on disk—every 64 MB in the illustration. This makes it possible to always find the indexes without resort to any stored information. The space from the end of one index segment to the start of the next is used to store blocks of named data, as well as other persistent information. To reflect the fact that the data stored there has all been written in a span of time, the segment of storage space is called an Era and the segment of index is called an Era Index.

The Era Indexes are the segments of the second level index discussed earlier. They play a role similar to that played by directories in a file system: when one named block from an Era is accessed, its Era index is consulted and cached. If other named blocks from the same Era are read while that index remains in RAM, all of their locations on disk are known from the cached Era index and so they will all be read with one disk access per named block. Since the blocks in one Era are close together, any subset of them can be accessed quickly with little seeking.

There is an advantage in having a Data Store correspond to a hard disk or RAID array, since there is at most one frontier per disk or array at which write activity can occur. Since the Era Index number in the annotation is of fixed size, as the capacity of storage devices grows either the number of bits used to encode the Era number or the size of an Era must get larger.

Journal Frame

Figure 9:
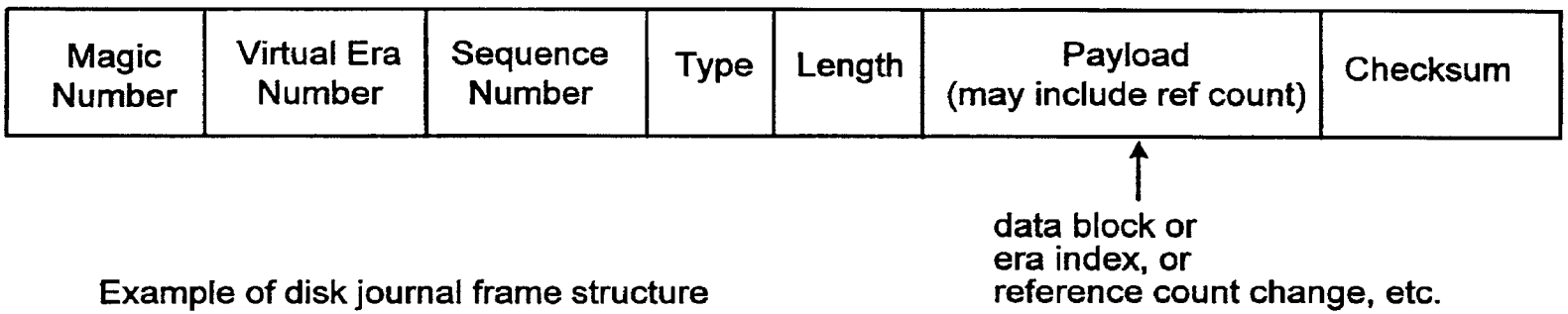
FIG. 9 shows a disk journal frame structure.

To aid in crash recovery, each item written to disk is enclosed in a journal frame. An example of the journal frame structure used in the preferred implementation is shown in FIG. 9. The journal frame starts with a fixed value that is used to mark the start of every frame. A different pseudorandom value is chosen for this mark each time the disk is formatted—such a fixed value that helps delineate the start of a stored record is sometimes called a "magic number". This is followed by a virtual Era number that helps verify that all of the frames belong to the same Era (virtual Era numbers have many more bits than actual Era numbers). Then follows a sequence number to help guarantee that no journal frames have been missed, a frame type which reflects what kind of information has been journaled, and then the length of the payload of information being protected (named blocks are of variable length, up to 64 KB) followed by the payload itself. A 32-bit checksum ends the journal frame, allowing data corruption to be readily detected.

If the payload is a content named block, it includes additional information such as the reference count for the block at the time it was last written (obtained from the entry annotation in the first level index). Since the log is written sequentially, there is no need to leave any space on disk between journal frames, even though they are of variable length. The only exception is at the end of an Era, where some space is left unused so that the first journal frame of the next Era (which is the Era index for the current Era) always starts at a 64 MB boundary.

In a crash recovery scenario, the Era indexes are redundant, because they can be regenerated from the other journal frames. The first level index, stored in RAM, is also redundant because it can be regenerated from the information in the journal.

The Reaper

If information is appended indefinitely to the frontier of the disk append-log, eventually the disk will be filled. The reaper is a program that runs as a background task, reclaiming freeable space on the disk and compacting retained data. The reaper treats the disk as a circular buffer, with the highest address on the disk adjacent to the lowest. Whenever at least 1% of the space used by the journal is freeable (due to objects having been deleted) the reaper runs (also under some other circumstances).

The reaper starts at the oldest era that it has not yet processed and examines all journal frames in that era. It verifies the checksum of each journal frame and initiates a recovery procedure if a bad frame is found. Any payload that is still relevant is copied to a new journal frame at the frontier, and the corresponding Era Number in the first level index is updated to point to the new location. Any payload that is not still relevant is omitted. If a frame is found which contains a named block which is not pointed to by the first level index, it is deemed no longer relevant and is omitted. This is how modifications to named blocks are handled: the replacement block is written to the Era at the frontier and its first level index entry is pointed to the new location. The reaper cleans up the old version as it comes across it. Once an Era has been reaped, its space is appended to the available free space.

Figure 10:
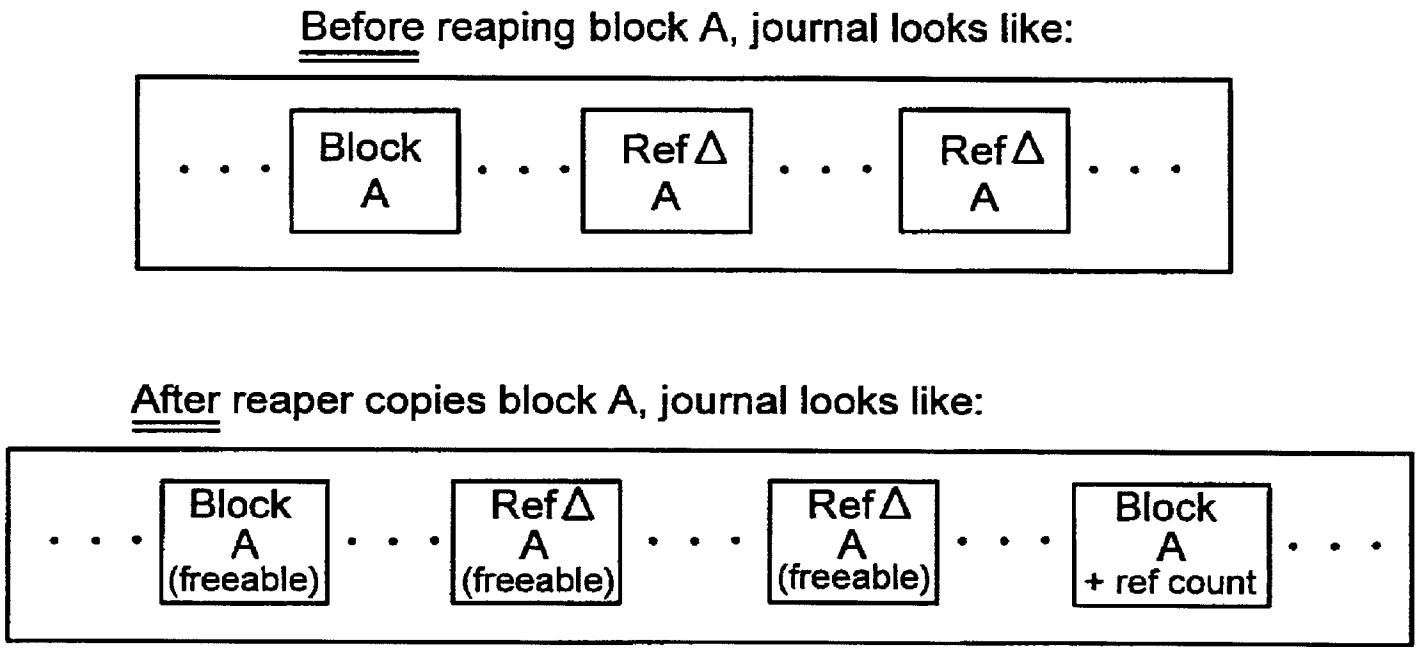
FIG. 10 illustrates the process of freeing space and compacting storage on disk (reaping) in the context of a shared block of storage.

The way that the reaper deals with reference counts is illustrated in FIG. 10. In the "before" picture, Block A is a content-named block and is near the oldest part of the journal. Since Block A was written, its reference count has been changed twice, and journal frames have been written to disk to record these changes. The reference count in the first level index (in RAM) was updated as these increment/decrement requests were received, and is current.

The reaper copies Block A to the Era at the frontier, including the current reference count in the new journal frame. The old copy of Block A can be added to the free space on disk as soon as the Era containing it is finished being reaped. The records of changes in Block A's reference counts that occurred before it was reaped are no longer relevant: the reference count recorded along with the new copy of Block A is up to date and can be used in the event of a crash to rebuild the first level index. The two reference count journal frames shown will be omitted when the reaper processes the Era's containing them, and their space will be freed at that time.

Multiple Data Stores

As discussed earlier, a Data Repository may comprise a number of storage servers, each of which may in turn comprise a number of data stores. Some number of the least significant bits of the block name may be used to define address ranges assigned to different data stores. Using address ranges for this purpose has the advantage that it distributes the indexing problem among the data stores in a scalable fashion.

Since block names are randomly distributed, the fraction of the total storage assigned to each data store is very closely proportional to the total size of all the address ranges assigned to it. The same address range can be assigned to multiple data stores as part of a fault tolerance (e.g., replication) scheme.

FIG. 11 shows an example of an assignment of address ranges to a set of four data stores. Here we have only shown the name bits that are involved in the address ranges assignments to data stores. Note that in this example, each address range is assigned to two data stores, as might be done in a system implementing two-fold replication of all data. Similarly, FIG. 12 illustrates an assignment of address ranges to eight data stores.

FIG. 13 shows a detail from FIG. 12, focusing on the first column. Here four data stores are assigned the address range where the first relevant name bits are both zero. In such a case, it may sometimes be necessary to distinguish the data stores that are assigned a range, having each play a different role. This could be done using a fixed order, but this has the drawback that if some roles involve more computational, network or storage load (e.g., one store is the primary replica source, or some block types are only replicated once), the extra burden would always fall on the same store.

FIG. 13 illustrates a method of assigning the data stores role-numbers in an equitable fashion. We first assign the stores in each address range a fixed order, and then we use an unused low-order portion of the block name to choose (essentially randomly) which data store will play role number 0. The other roles are then assigned in cyclic order.

Tolerating Read Errors

Hard disks employ redundant encoding at the level of disk sectors to allow them to tolerate hardware problems and still read data correctly. Given that adding redundant information on disk subtracts from the space available for data storage, disk manufacturers add only as much error correction information as is necessary. A typical modem disk specifies that a sector on disk will be unreadable no more often than once in every $10^{14}$ bits that are read.

The reaping mechanism described above continually copies and rewrites data. This prevents latent errors from accumulating, but it also causes the data on the disk to be read many times. If 25 500 GB disks are each read completely once, this adds up to $10^{14}$ bits. In storage systems with many large disks that are continually being reaped, one unreadable sector in $10^{14}$ bits read would cause frequent failures.

In RAID systems, a group of D disks is coupled and parity information (i.e., sum modulo 2 of all corresponding bits) for corresponding sectors on D−1 of the disks is recorded on the corresponding sector of the D-th disk. If a read error occurs on one disk, the unreadable sector can be reconstructed from the information on the other disks.

Figure 14:
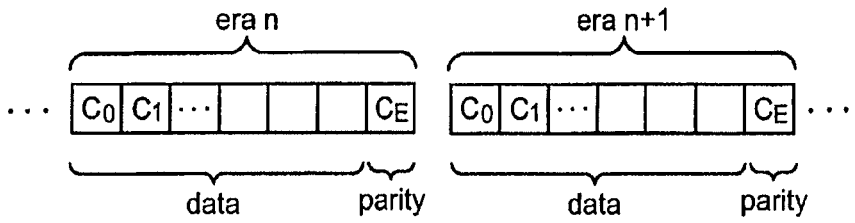
FIG. 14 illustrates the addition of parity information to Eras to allow recovery from disk read errors.

A similar technique can be employed to deal with unreadable sectors in the on-disk journal of the present invention. FIG. 14 illustrates the technique. Here each Era is divided into E+1 equal-sized chunks: E chunks containing data and one chunk containing parity information. Each bit of the parity chunk $C_E$ is the sum modulo two (XOR) of the corresponding bits of all the data chunks $C_i$. If one chunk contains unreadable data, it can be reconstructed from the other chunks of the Era by XOR-ing them all together.

If we assume that unreadable sectors occur randomly, the chance of two bad sectors occurring in the same Era is very small. If an Era is 64 MB and an unreadable sector occurs once in $10^{14}$ bits read, the chance of encountering a second unreadable sector in an Era that already contains one is about one in 40,000. Thus we would need to read a million 500 GB disks completely before we would expect to see two unreadable sectors in the same Era.

Figure 15:
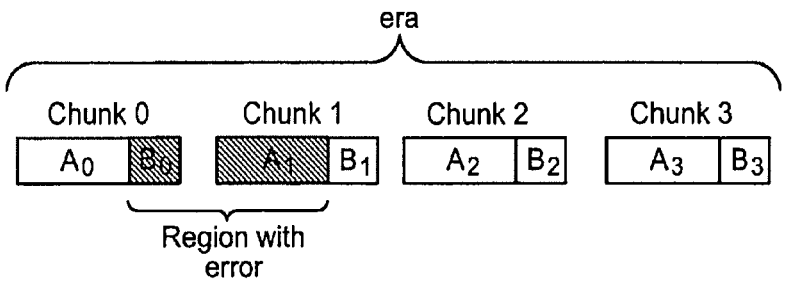
FIG. 15 illustrates read-error recovery when an error encompasses a region overlapping two adjacent chunks of an Era.

If there is some spatial correlation, so that bad sectors immediately adjacent to other bad sectors are more likely, this can be dealt with by increasing the size of the chunks. As long as no more than one chunk in an Era contains an error, the error will be recoverable. In fact, as long as the sequence of bytes containing the error is shorter than a chunk (even if it overlaps two chunks), the error is still recoverable. This is illustrated in FIG. 15. Here we show an example of an Era with just four chunks, the last of which is the bitwise XOR of the first three. If the shaded region consisting of $B_0$ and $A_1$ is unreadable, then it can be recovered. $B_0$ is recovered by XOR-together the corresponding regions of the other three chunks (namely $B_1$, $B_2$ and $B_3$), while $A_1$ is similarly recovered by XOR-ing together $A_0$, $A_2$ and $A_3$.

If the regions containing errors can be localized to a fraction of a chunk, then this technique can be applied directly. In the preferred implementation, the chunk size is related to operating system buffer sizes and errors are only localized by the operating system to entire chunks. In this case, the region containing the unreadable sectors ($B_0$ and $A_1$ in the illustration of FIG. 15) can still be identified by using the checksums in the journal frames (see FIG. 9). Once two adjacent chunks containing unreadable sectors have been identified, each possible alignment of a chunk-sized region overlapping the two is assumed in turn and the data is tentatively corrected based on that assumption. The first alignment that produces correct checksums in all journal frames is used as the definitive correction.

Figure 16:
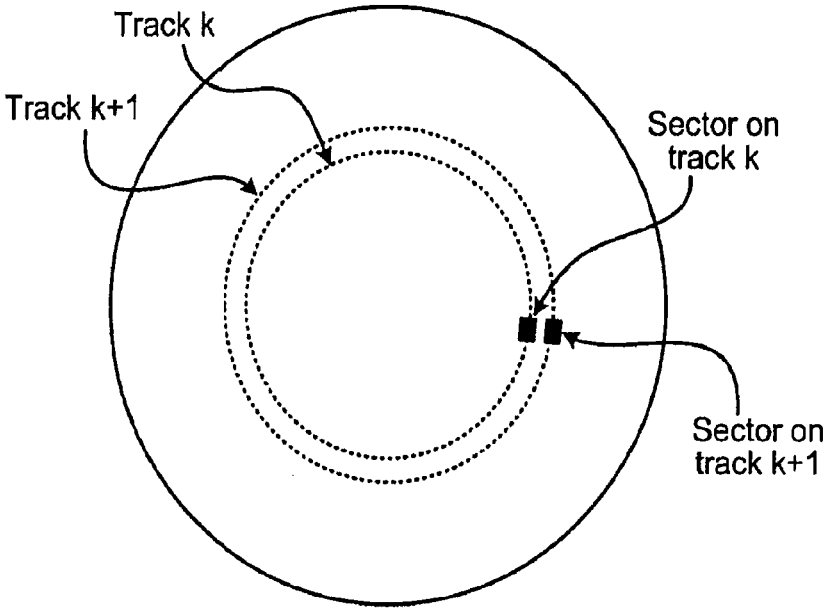
FIG. 16 shows two sectors that are radially adjacent on a disk.

This technique can be extended to deal with localized correlations across disk tracks. FIG. 16 shows a schematic diagram of a disk, showing tracks and sectors. A track on a disk consists of all of the data that can be accessed without moving the read/write heads radially (i.e., without seeking). It might be the case that, for adjacent tracks of data on a disk, sectors that are on different tracks but adjacent to each other radially may have correlated failures.

Figure 17:
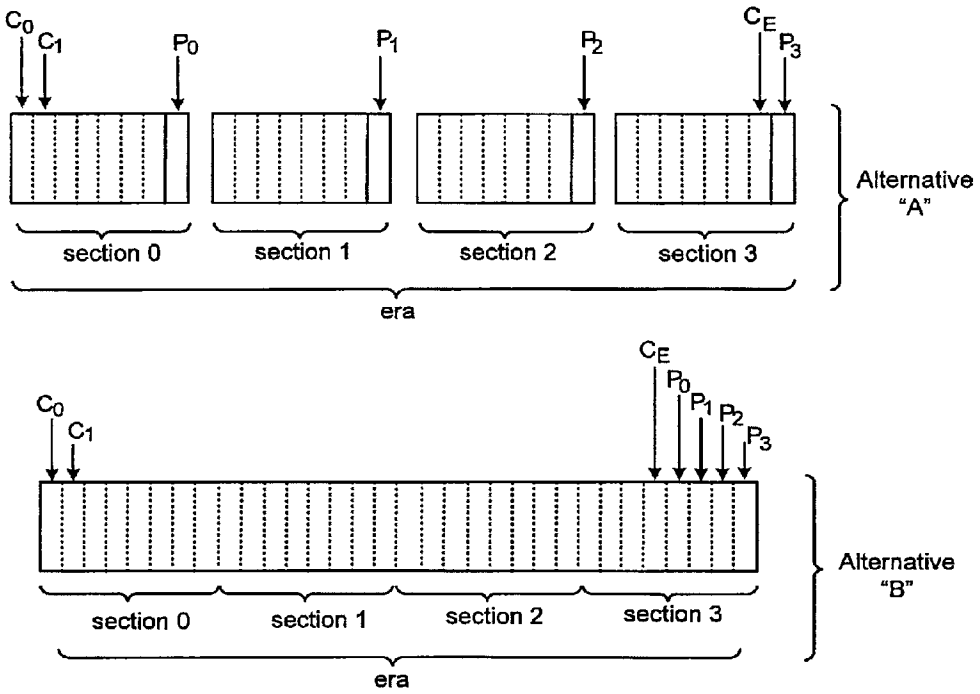
FIG. 17 illustrates two alternatives for organizing parity information for read-error recovery when errors on radially adjacent sectors are correlated.

This could be dealt with by making the Era size smaller than the storage capacity of any single track, so that the parity information in each Era can be used to deal with the sector errors independently. If this results in an inconveniently small Era, this could alternatively be dealt with by dividing an Era up into sections, each of which is smaller than any single track. This approach is illustrated in FIG. 17. In alternative A, each section includes blocks of data and a parity block. In the preferred alternative B, the parity blocks are all put into the last section, so that this looks essentially like the original scheme of FIG. 14, but with the parity information at the end of the Era having additional structure.

Other Implementations

First-level index on disk: An on-disk first level index with a very low rate of false positives and direct pointers to block locations could act as a very compact alternative to a full hash table on disk, almost always providing a pointer to the block name with a single disk access. If some in-memory scheme for caching index entries were used in conjunction with an on-disk first-level index, the compactness of the on-disk index would be valuable in merging updates made to the in-memory cache into the on-disk index: the amount of data that would need to be read and written for an update pass over the entire on-disk structure would be reduced by a large factor.

First-level index using hash buckets: A structure is described for the first level index in the preferred implementation which involves allocating space only as needed, splitting a fixed size segment of the index into two new fixed size segments whenever it becomes full. There are many alternative structures which could be used. For example, fixed size hash buckets, each of which contains a segment of the index, is a simple alternative. This approach involves pre-allocating the full space for the index. In order to account for statistical variation in the filling of the hash buckets, a small percentage of extra space needs to be allocated to each hash bucket to accommodate a desired average filling.

First-level index using array with landmarks: Another alternative structure that is logically possible for the first level index is a single long array—a first level index with just a single segment. This would be very slow, since the deltas would always have to be traversed from the start. This could be sped up, however, by inserting a set of landmark-entries regularly spaced in the range of possible names, and maintaining external pointers that track the positions of these landmark entries. If the landmark entries are initially evenly spaced in an array sized for the maximum number of entries that the index supports, this is very similar to the hash-bucket approach, but has the advantage that no extra space needs to be allocated to allow for statistical variation in the filling of the different hash buckets. If a bucket overflows, entries after it (including a landmark) can be moved down a bit to make room. This makes it practical to use much smaller hash buckets (with concomitantly greater statistical fluctuation in filling), so that the amount of linear search (traversing a list of deltas) for each lookup is reduced.

Accumulating space-usage statistics: It is of interest to be able to accumulate statistics for the data store regarding space used (i.e., not freeable) and amount of shared storage. This can be accomplished by maintaining a running total of the space occupied by blocks with non-zero reference counts, and a separate total of the number of bytes referenced (i.e., sum of block size times reference count). These totals can be updated as reference counts are incremented and decremented as long as the size of the corresponding blocks are known. To make this information more efficient to access, a copy of the block size can be added to the Era Index entry of FIG. 6.

Reference count deltas: The reference count that was current when a block was last reaped is recorded along with the block. Only changes relative to this value need to be recorded in the first level index: each time a block is reaped and its reference count is recorded on disk, the value recorded in the first level index can be reset to zero. The full reference count for a block is then the sum of the base value stored with the block and the reference count delta stored in the first level index. All blocks with reference counts that haven't changed since they were last reaped will have reference count deltas of zero in the first level index. For efficiency in reaping and in accumulating space usage statistics, a copy of the base value of the reference count recorded with the block can be added to the Era Index entry of FIG. 6.

Multiple reference counts per block: If data from multiple sources (e.g., physical locations, administrative domains or file systems) has been deposited in a data store, it may be desirable to be able to efficiently separate out the data from a particular source at a later time, to be copied to another data store with correct reference counts. This need might arise, for example, in a data recovery scenario where data from multiple Data Repositories has been replicated to a single Data Repository, and the loss of several data stores at one of the source Repositories requires recovery of all blocks belonging to that source in some set of address ranges. To enable efficient separation by source, a separate reference count can be stored with each block for each defined data source that references it. If only reference count deltas are stored in the first level index, then blocks that haven't been referenced since the last time they were reaped will have all deltas of zero, and this state can be efficiently encoded in the first level index as the default state. A list of identifiers of sources associated with a given data block can be stored with that block, and reference count deltas in the block's first level index entry can refer to the ordinal number within the list to provide an efficient encoding. When a source references a data block for the first time, the source identifier can be used directly to label the reference count delta in the first level index entry. For efficiency, a copy of the list of sources associated with a block and the corresponding reference counts (from the time the block was last reaped) can be added to the Era Index entry of FIG. 6.

Figures 18, 19:
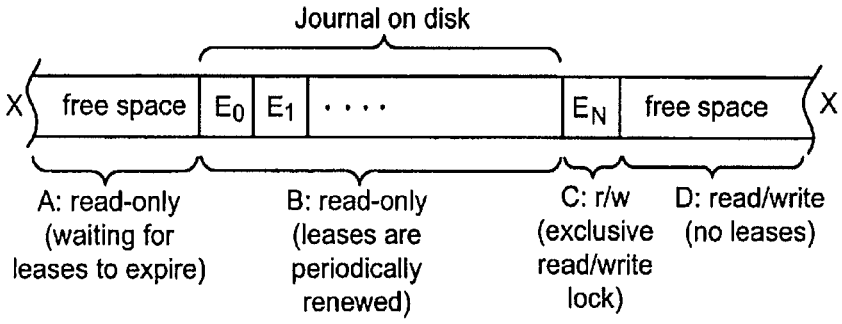
FIG. 18 shows three alternative byte-oriented formats for entries in the first level index.
FIG. 19 illustrates the use of byte-range retention leases to protect a data store journal from modification.

First-level index with default values: FIG. 18 shows three examples of alternative byte-oriented entry formats for the first level index—FIG. 4 showed the format used in the preferred implementation. Alternative format A uses more more bits for era numbers than the format of FIG. 4 and reserves just one bit for other information. Every other piece of information that may be associated with a named block is assigned a default value, and if all pieces of information related to a particular entry have their default values, then no other information needs to be explicitly represented. For example, it is normally the case that most blocks haven't been recently deposited and so don't have leases, and so no bits need to be reserved in most entries for lease information, as is done in the format of FIG. 4. If all extra information has its default value, a format A entry is three bytes long.

First-level index without pointers to second-level index: A second alternative entry format B is shown in FIG. 18. This format has one less bit of collision resistance than format A and uses the same extra-information flag and default conventions. In this format, no information about a second-level index is stored in the first level index, so that the first level index size is minimized. A first level index using this format still identifies new block names efficiently, and caching of Era Index information may be sufficient to identify existing block names efficiently. Information recording the locations of new blocks might be cached in memory (perhaps as annotations) so that updates to an on-disk second level index (separate from the Era Indexes) can be aggregated.

First-level index with approximate disk locations: A third alternative entry format C would be useful in an on-disk first level index of the kind discussed earlier in this section. In this alternative, the annotation includes the full disk location of the named block. In this case, we make the delta about twice as long, adding 7 more bits of collision resistance, so that the chance of a false positive match (which would result in an unnecessary disk read) is $2^{-13}$. Two bytes are saved from the location information by only pointing to the 64 KB chunk that contains the start of the named block. All reads are 130 KB long, to ensure that the whole block (maximum 64 KB long) is read. Some extra information is included in the annotation in the rare case where the first journal frame in the region read can't be found by scanning for the fixed value (magic number) that marks its start.

First-level index with non-byte-aligned entries: Non-byte oriented entry formats can of course also be employed. Variable length Golomb codes are designed precisely for storing the kinds of geometrically distributed deltas that we are dealing with here, and representing annotations with exactly the number of bits required may reduce memory usage slightly. Ignoring the overhead of handling collisions (which is a separate issue), the theoretical limit for codes in this context is an average of ($r+\log_2 e$) bits to represent each delta (where $r=\log_2(M/N)$), and Golomb codes will come very close to this limit. The encoding used in the preferred implementation uses about ($r+2.3$) bits per delta, which is less than one bit more than the theoretical minimum.

First level index with more or less compaction: The amount of compaction used in the first level index is a practical tradeoff: size versus speed and simplicity. For example, using non-byte aligned entries saves additional space, at the cost of additional complexity. Very simple implementations might use a separate hash table for all cases where the difference between adjacent sorted names is too big or too small for a fixed size delta representation, or embed full names directly into the list of deltas in such cases. Note that when a new name agrees with an existing name in the first level index up to its truncation point, only one of the names actually needs to be represented in the first level index with additional resolution in order to preserve the property that new names can collide with at most one existing name in the first level index. Another simple alternative implementation would use truncated names in the first level index rather than deltas, truncating each name to a unique initial segment and relying on a separate compression process applied to segments of the first level index to reduce their size when they aren't being actively accessed.

Including other types of information in the index: Several types of information have been mentioned as useful to include in a first level index entry annotation: leases, reference counts, block locations on disk, and the location on disk of additional indexing information. The presence of a complete compact indexing structure to which other information related to individual named blocks can be attached obviously has many other uses. Other information which could be attached to an index entry includes: locking information, temporary markers for blocks that should be copied somewhere or migrated, cached full block name, cached disk location, cached object metadata, age or activity information, other location information (which disk, which tape, etc.), security or authorization information, and time related information. As long as almost all blocks have their default values for the optional information, allowing for it doesn't appreciably increase the size of the index. Furthermore, as was discussed in the reference count delta and space usage examples above, information that is initially attached to the first level index entries can be moved to the second level index entries when a block is reaped.

Shredding or migrating data while reaping: The reaper could provide special processing when deleting some kinds of blocks. For example, blocks that were retained for some period of time because of government regulatory requirements may require special shredding (multiple overwrites with random data) when they are finally deleted. Shredding could also be the norm. The reaper could also be involved in data migration, moving data which hasn't been accessed recently (and so is not expected to be accessed soon) or which has long-term retention requirements (and so will not change soon) to disks that can be turned off, or to offline media. In this case, at least the first level index information would need to be kept on media that remain accessible. More generally, data can be moved to appropriate targets (storage devices or portions of storage devices) based on a prediction of when the data will next be needed, or next need to change. Data which must not change during some period of time might even be aggregated on a storage resource where a retention period constraint is enforced by the storage resource.

Byte-range retention leases: If access to a storage resource is shared by more than one data store (as it might be, for example, in a storage area network), it is desirable to have the shared storage resource prevent one data store from modifying journal frames written by another data store. It is also desirable to prevent software bugs in data store software from corrupting journal frames that have been fully written and closed to further modification. Both of these goals can be accomplished with byte-range retention leases. A retention lease specifies that a range of storage locations can be read but cannot be modified by any process (including the data store process that originally wrote the data there) for some specified period of time, which cannot be decreased. The range of bytes is not reserved for access by one process, it is reserved for access by no process. Leases for regions that are part of the journal are periodically renewed, so that the journal remains unmodifiable. Journal frames that have been reaped and added to free space stop having their leases renewed, and these leases eventually expire and the space becomes available for reuse. Retention leases are persistent across ordinary hardware reboots and resets. In a typical data store usage scenario, leases might last for days or weeks—long enough that system maintenance is unlikely to prevent renewals for a long enough period that leases on unfreed journal frames expire. FIG. 19 provides an example use of retention leases. Region A was formerly part of the journal but is now free space in which leases have not yet expired. Region B consists of Eras that have been fully written and closed to further modification. Region C consists of space that can be exclusively written to by one particular data store process. Region D consists of free space that can be read or written by any process. In this example, retention leases are initiated, extended and released for entire Eras, rather than for individual journal frames.

Unified addressing of blocks: We assumed, for simplicity, that in a multi data store system the bits derived from the block name that are used for distributing the blocks between different data stores are different than the bits that are used to distribute data between segments of the first level index. This made our randomness assumptions simpler, but it meant that the stored truncated names in the first level index didn't contain information about the address ranges used for inter-store distribution. If this assumption doesn't hold, and the same initial portion of each block name is used for both kinds of distribution, the main thing that changes is that the block names held by a particular data store are concentrated into a smaller total range, and so are the truncated names. Within each range, the names are still distributed randomly. This changes the appropriate point at which to truncate the block names, since the average separation depends upon the total available range and the maximum number of blocks being indexed and stored. If the assignment of ranges to a data store changes with time but the total number of named blocks that the store can index doesn't change, then it may be that the mean separation between entries (and hence the point at which block names need to be truncated to form entries in the first level index) changes. This adds some complexity. Regenerating the first level index with entries truncated at a different position might best be done incrementally by the reaper, since in general all of the full block names would have to be re-read from disk.

Randomness and block names: Block names might only be approximately random (i.e., characterized by a high entropy probability distribution), or only a portion of the block name may be approximately random. There should be enough randomness that, in a large list of sorted names, the differences between adjacent names are reasonably predictable. If that is the case, then we know where to truncate the names so that differences can usually be represented by a value that is small enough to be compact but is hardly ever zero (and so we rarely require additional information to represent names distinctly). Block names do not, of course, have to be created randomly or pseudorandomly to have a portion that is sufficiently random to work for the index. For example, if blocks are named by long timestamps of when they were created, then the least significant portion of the timestamp may be quite random.

Varying other features: The description of the preferred implementation was made very specific in order to promote clarity, but many features could be varied. For example, different cryptographic hash functions could be used, disks could be virtual disks (for example, in a storage area network) or even other kinds of media. All of the storage could be in RAM. On-disk structure could be very different, with different sizes and structure of Eras, different structure and placement of Era Indexes or even elimination of Era Indexes (and hence Eras) in favor of other kinds of second level indexes, or even putting more direct block location information into RAM. The append log structure could be more sophisticated with more use of pointers to segments of disk data, so that information that hasn't changed is copied less. The log structure could be abandoned in favor of some other structure, with no use made of temporal locality or temporal locality exploited in some other manner. If there are multiple data store instances running on the same (or tightly coupled) physical hardware, they may share some resources. For example, some of them might share a single common first level index. One data store might manage more than one set of storage resources, allocating named blocks to different resources and moving data among them based on storage and migration policies, access patterns and changes in the number, availability or nature of the resources.

Other kinds of indexing: Reference is made throughout to blocks and block names, but blocks are just some of the possible record types, with associated record names, that could be indexed. The indexing techniques disclosed here could also be applied in other contexts. For example, the compressed first level index technique (with or without the handling of collisions) might be useful in places where Bloom Filters are currently employed, particularly where a compact representation is important (e.g., sharing information about a Web cache across the network). The first level index could also be used by itself to provide a compact index for a fixed set of randomly named records.

It is to be understood that the foregoing description is intended to illustrate a few possible implementations of the invention. These and a great many other implementations are within the scope of the appended claims.

What is claimed is:

1. A method for constructing an index suitable for indexing a large set of records identified by long generally randomly distributed record names, and for answering membership queries about the set, the method comprising:

adding a new record to the set and assigning the new record a new record name using a process designed to produce names where at least a portion of each name is at least approximately random;

determining that the new record name is not already represented in the index by checking a first level index that does not contain information sufficient to reconstruct the complete record names of records that have already been added to the index;

abbreviating the new record name to form a new abbreviated name that is shorter than the new record name but that is sufficient to distinguish it from record names already represented in the index;

combining the new abbreviated name with an abbreviated name of a record already represented in the first level index, to form a combined record name which is shorter than either of the abbreviated names that were combined;

adding the combined record name to the first level index to form a new first level index entry that represents the new record;

adding a new entry to a second level index that includes the complete new record name or enough information to reconstruct it;

determining that a queried record name is already represented in the index by first determining that the queried record name is represented by the new first level index entry and then determining that the queried record name is represented by the new second level index entry, wherein each different record in the set is assigned a different record name;

wherein each different record in the set has a different entry in the first level index;

wherein at least a portion of the first level index is ordered based on abbreviated record names.

2. The method of claim 1 wherein at least a portion of the index is organized based on when records were added to the index.

3. The method of claim 1 wherein the first level index is stored in RAM and the second level index is stored on disk.

4. The method of claim 1 wherein the abbreviated record name is obtained by omitting some subset of the bits of the binary value that represents the record name.

5. The method of claim 1 wherein the combining involves computing an arithmetic difference of the two abbreviated names or computing some other arithmetic or finite-field arithmetic operations involving portions of the two abbreviated names.

6. The method of claim 1 wherein the process of assigning the new record name involves generating a pseudo-random name, or computing a cryptographic hash of at least a portion of the record itself or computing a cryptographic hash of some combination of record identifying information which is known to be unique.

7. The method of claim 1 wherein a portion of the index represents a set of records for which record names were added to the index during a span of time that includes the time that the new record was added, and the portion is retrieved as a unit in order to get additional information about the new record, and information about other records added during the span of time is cached in RAM.

8. The method of claim 1 wherein records or index information are stored in a sequential log-structure on disk, and extra information recording the bitwise XOR of a set of blocks comprising a segment of the sequential log-structure is written to disk to allow unreadable sectors on disk to be reconstructed.

9. The method of claim 1 wherein the space of possible record names is divided up into a set of disjoint subspaces, each of which is associated with one or more of a plurality of instances of the index.

10. The method of claim 9 wherein different indexes associated with the same subspace are assigned different roles based on a portion of the record name.

11. The method of claim 1 wherein the new record is a block of content and the new record name is a cryptographic hash of the block of content, and the index is queried in order to avoid repeatedly transmitting or repeatedly storing the block of content.

12. The method of claim 1 wherein the record name is added to the index a second time, and a reference count associated with the record name indicates that the record has been added twice.

13. The method of claim 1 wherein an annotation is attached to the new entry in the first level index which includes information related to the new record or an indication of where additional information can be found.

14. The method of claim 1 further comprising:

adding a second new record to the set and assigning the second new record a second new record name which is different than the new record name;

determining that the first level index does not contain sufficient information to decide whether or not the second new record name is different than the first new record name; and adding an entry to the first level index that represents the second new record name and that is shorter than the second new record name.

*15. A method for constructing an index suitable for indexing a large set of records identified by long generally randomly distributed record names, and for answering membership queries about the set, the method comprising:*

*adding a new record to the set and assigning the new record a new record name using a process designed to produce names where at least a portion of each name is at least approximately random;*

*determining that the new record name is not already represented in the index by checking a first level index that does not contain information sufficient to reconstruct the complete record names of records that have already been added to the index;*

*adding a new entry representing the new record to an index-cache that represents a fraction of the record entries in the index;*

*determining that a newer record has been assigned the same name as the new record by retrieving a group of record names that were added to the index at about the same time that the new record was added.*

*16. The method of claim 15 wherein the index-cache is stored in RAM and the first level index is stored on disk or in other non-volatile memory.*

*17. The method of claim 15 further comprising:*

*abbreviating the new record name to form a new abbreviated name that is shorter than the new record name but that is sufficient to distinguish it from record names already represented in the index;*

*combining the new abbreviated name with an abbreviated name of a record already represented in the first level index, to form a combined record name that is shorter than either of the abbreviated names that were combined; and*

*adding the combined record name to the first level index to form a new first level index entry that represents the new record;*

*wherein at least a portion of the first level index is ordered based on abbreviated record names.*

*18. The method of claim 15 further comprising:*

*adding a new entry to a second level index that includes the complete new record name or enough information to reconstruct it; and*

*determining that a queried record name is already represented in the index by first determining that the queried record name is represented by the new first level index entry and then determining that the queried record name is represented by the new second level index entry.*

*19. The method of claim 15,*

*wherein each different record in the set is assigned a different record name; and*

*wherein each different record in the set has a different entry in the first level index.*

* * * * *